United States Patent
Walker et al.

(10) Patent No.: US 6,655,126 B2
(45) Date of Patent: Dec. 2, 2003

(54) OVERTHRUST PROTECTION SYSTEM

(75) Inventors: Joseph H Walker, Derby (GB); John R W Whitmarsh, Derby (GB); Stephen G Garner, Derby (GB)

(73) Assignee: Rolls-Royce plc, London (GB)

( * ) Notice: Subject to any disclaimer, the term of this patent is extended or adjusted under 35 U.S.C. 154(b) by 79 days.

(21) Appl. No.: 09/985,571

(22) Filed: Nov. 5, 2001

(65) Prior Publication Data

US 2003/0205042 A1 Nov. 6, 2003

(30) Foreign Application Priority Data

Nov. 8, 2000 (GB) ............................................. 0027288

(51) Int. Cl.[7] .................................................. F02C 9/28
(52) U.S. Cl. ...................................... 60/243; 60/39.281
(58) Field of Search ............................... 60/39.281, 243

(56) References Cited

U.S. PATENT DOCUMENTS

| 3,808,801 A | | 5/1974 | Taylor | |
|---|---|---|---|---|
| 4,597,407 A | | 7/1986 | Smith | |
| 4,716,723 A | * | 1/1988 | Ralston et al. | 60/39.281 |
| 4,987,737 A | * | 1/1991 | Cantwell | 60/39.281 |
| 5,003,769 A | * | 4/1991 | Cantwell | 60/39.281 |

FOREIGN PATENT DOCUMENTS

| EP | 0 388 046 A | 9/1990 |
|---|---|---|
| GB | 2 125 185 A | 2/1984 |
| WO | PCT/US99/28787 A | 6/2000 |

* cited by examiner

*Primary Examiner*—Louis J. Casaregola
(74) *Attorney, Agent, or Firm*—W. Warren Taltavull; Manelli, Denison & Selter PLLC

(57) ABSTRACT

An overthrust protection system for a gas turbine in which fuel is supplied at a controlled flow rate to a combustor (4) of the gas turbine. The overthrust protection system uses a bypass valve (24) to divert fuel flow away from the combustor (4). The opening of this valve is controlled by an overthrust controller (28) to divert fuel flow in response to a detected overthrust condition of the gas turbine. Diverting some of the fuel flow in this manner brings about a reduction in the thrust, allowing the overthrust condition to be controlled without resorting to a complete shut down of the gas turbine.

6 Claims, 2 Drawing Sheets

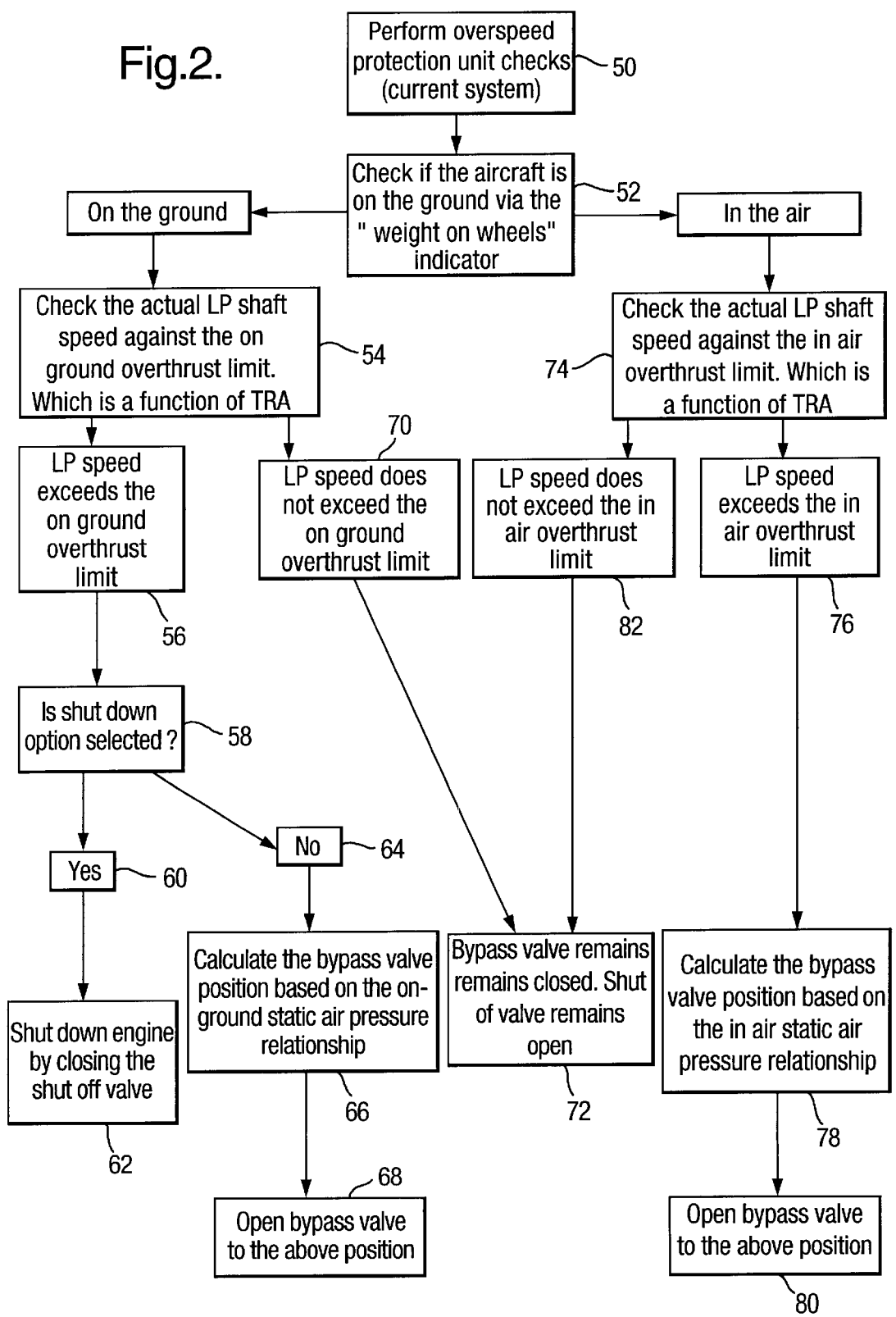

OVERTHRUST PROTECTION SYSTEM

FIELD OF THE INVENTION

This invention relates to overthrust protection for gas turbine power plant, primarily although not necessarily exclusively for aero gas turbine engines.

BACKGROUND

Gas turbine power plant are commonly operated under the control of an electronic engine control system, one major element of which is a fuel control system to control the supply of fuel to the combustor of the gas turbine. The fuel control system calculates the gas turbine's fuel demand based on the desired level of thrust, indicated for instance by a throttle lever position set by the operator (e.g. the pilot or autopilot of an aircraft in the case of an aero engine), accounting also for other operating parameters of the gas turbine such as pressures and shaft speeds. This calculated fuel demand is then applied by the control system to set a fuel metering valve which controls the flow rate of fuel to the combustor.

It is also important that the control system includes safeguards to protect the gas turbine against faults occurring, for example, in the control system itself, the sensors from which its inputs are derived, or within other components of the gas turbine. One such safeguard, with which the present invention is particularly concerned, is the prevention of very high, uncontrolled thrust levels ("overthrust") arising as a result of faults within the gas turbine or its control system. This safeguard is particularly important in the context of aero gas turbine engines, where such uncontrolled high thrust levels can give rise to undesirable, and potentially dangerous imbalances in the thrust developed by multiple engines of an aircraft.

One known measure to provide some protection against overthrust is the use of what is termed an "overspeed protection unit" or "OPU" as part of the fuel control system. This is a device that has as its inputs the shaft speeds for e.g. the high pressure and low pressure shafts of a multi-stage gas turbine. The output from the device controls a fuel shut-off valve which is operable to cut-off the fuel supply to the combustor, thus shutting down the engine, when the shaft speeds reach excessively high levels, indicative of an overthrust condition.

Although the use of an OPU goes some way to providing overthrust protection it is by no means a complete solution and it is recognised that some enhancement is required to enable the aircraft to be fully protected against overthrust.

SUMMARY OF THE INVENTION

The present invention is generally concerned with providing a system and method offering an improved safeguard against overthrust.

In one of its aspects there is provided an overthrust protection system for a gas turbine in which fuel is supplied at a controlled flow rate to a combustor of the gas turbine, the overthrust protection system comprising:
  a bypass valve for diverting a controlled amount of fuel flow away from the combustor;
  detection means for detecting an overthrust condition of the gas turbine; and
  overthrust control means for controlling the bypass. valve to divert the controlled amount of fuel flow in response to a detected overthrust condition.

In another aspect, the invention provides a method of verthrust protection for a gas turbine in which fuel is supplied at a controlled flow rate to a combustor of the gas turbine, the method comprising:
  detecting an overthrust condition of the gas turbine; and
  diverting a controlled amount of fuel flow away from the combustor in response to the detected overthrust condition.

Diverting some of the fuel flow in this manner brings about a reduction in the thrust, allowing the overthrust condition to be controlled without resorting to a complete shut down of the gas turbine. This approach can offer particular advantages when shutting down the gas turbine might itself have undesirable effects, potentially more threatening than the overthrust condition itself, for example in the case when an overthrust condition occurs during the final approach of an aircraft when landing.

The bypass valve may be an open/closed device to divert a fixed fraction of the fuel flow when the overthrust condition is detected, however it is more preferable to use a valve which can be controlled to divert a variable fraction of the flow. In this way the reaction of the overthrust protection system can be more readily controlled to suit the circumstances of any particular fault condition.

In order to determine the presence of an overthrust condition, the speed of one or more shafts of the gas turbine can be sensed and compared with a predetermined threshold, much in the same way as the shaft speeds are detected by the known OPU. Preferably, however, these measurements are supplemented by further parameters indicative of the operating state of the gas turbine or the overall system (e.g. aircraft) of which it forms a part, in order that the overthrust condition can be determined with reference to these operating states. Such further parameters can usefully include, for instance, throttle position (i.e. demanded thrust), 'weight on wheels' indicator and static air pressure.

Advantageously, the ability to shut down the gas turbine, for example by employing a fuel shut-off valve in addition to the bypass valve, is retained, because there may be situations in which a complete shut down is preferable to a reduction in thrust. In such situations, the overthrust control means preferably controls the operation of the fuel shut-off valve, closing this valve whilst the bypass valve also remains closed.

The normal supply of fuel to the combustor, that is the flow of which a fraction can be diverted by operation of the bypass valve, can be controlled in a conventional manner independently of operation of the overthrust protection system. By keeping the two systems independent, the overthrust protection system can appropriately react to overthrust conditions even when brought about by faults in the fuel control system itself.

This independence of the fuel and overthrust systems preferably extends also to the sensors from which their inputs are derived. For example, where both the fuel control system and overthrust protection system require shaft speeds as inputs, separate shaft speed sensors are desirably provided for each system. Likewise, when used, inputs to the overthrust protection system such as 'weight on wheels' indication, throttle angle and static air pressure should preferably be independent from the normal fuel supply system.

BRIEF DESCRIPTION OF THE DRAWINGS

FIG. 2 shows the control logic for the system.

DESCRIPTION OF AN EMBODIMENT

Figure 1:
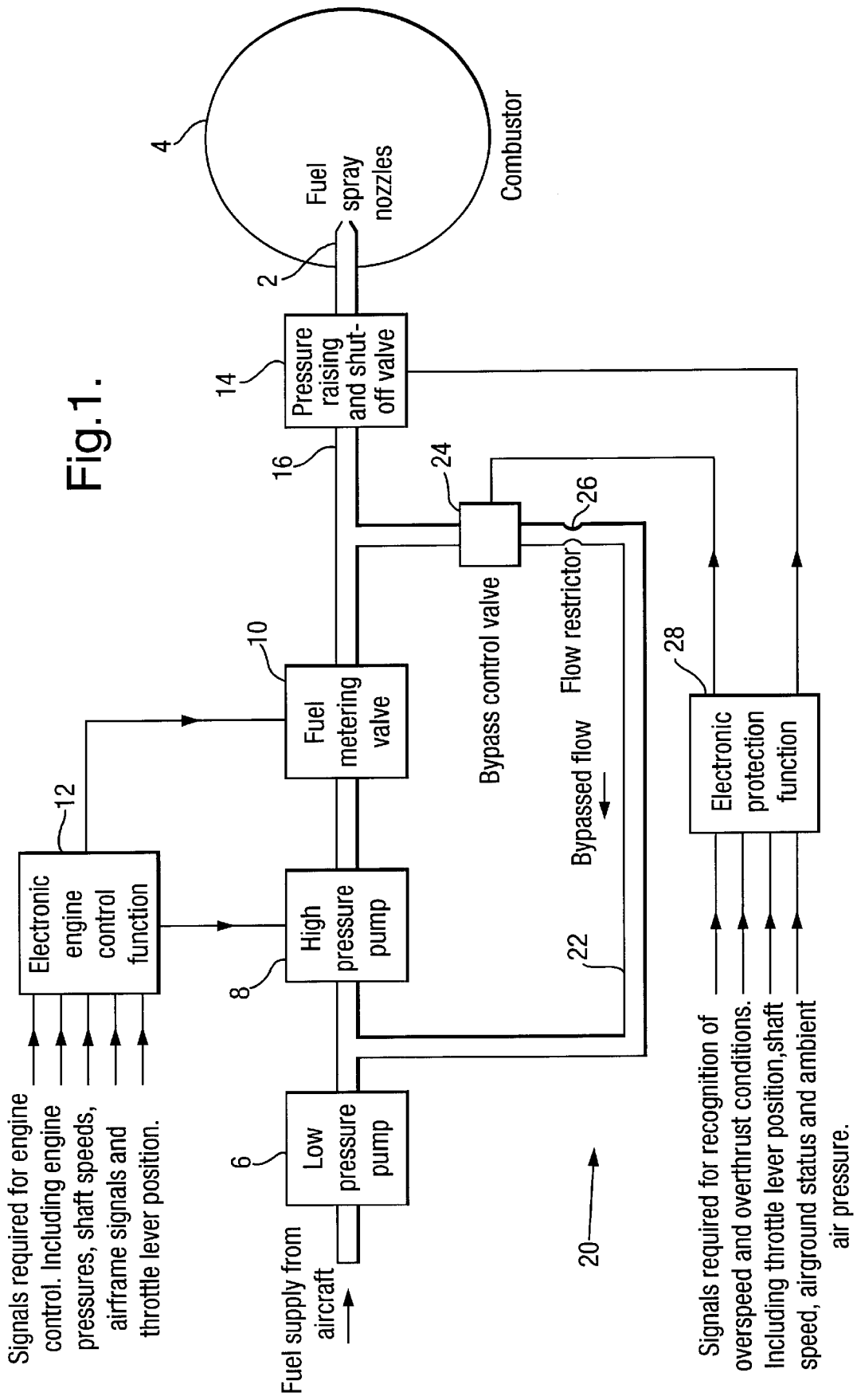
FIG. 1 is a schematic representation of the fuel control system for an aero gas turbine engine employing an overthrust protection system in accordance with an embodiment of the present invention.

An embodiment of the invention is illustrated in FIG. 1 and described below, by way of example, in the context of a fuel control system for an aero gas turbine engine. It will be appreciated, however, that the invention is applicable to other gas turbine power plant.

The problems associated with overthrust conditions in a gas turbine can be particularly acute in the case of an aero engine. This is because an aircraft propelled by multiple gas turbines will be destabilised, potentially catastrophically so, by any serious imbalance between the thrust provided by each engine. There are three specific 'flight' cases in which any such imbalance in thrust, created by one engine producing excessive thrust out of throttle control, is of particular concern.

The first is during take-off, before the aircraft speed reaches V1 (the speed after which the take-off cannot be aborted). If an engine runs up to an excess thrust level under these conditions, the pilot will initiate a 'Refused Take-Off Procedure', to abort the take-off, by retarding the throttles to idle and applying the brake. If the rogue, overthrusting engine does not respond to the throttle, the aircraft experiences a high asymmetrical thrust resulting in a sever yaw to one side, potentially causing the aircraft to veer off the runway.

The second flight case of concern is during landing, after touch-down on the runway and just prior to deployment of the thrust reversers. Similarly to the scenario described immediately above, if a rogue engine accelerates to an overthrust condition, it is very likely that the induced yaw will force the aircraft to veer off the runway at high speed, with potentially catastrophic results.

In both the first and second cases described above, a conventional overspeed protection unit (OPU) may provide an adequate safeguard, although it is possible that an imbalance in the thrust sufficient to cause the aircraft to veer violently will occur even before the shaft speeds reach overspeed limits to cause the OPU to shut down the rogue engine. This is because aircraft controllability problems can be experienced on the ground at thrust levels as low as 75% of rated thrust, whereas in flight thrust related controllability problems are not normally encountered unless the engine thrust exceeds the rated value. The OPU is necessarily set to shut down the engine only once the shaft speeds exceed the 'red-line' value by some predetermined amount.

The third case of particular concern is during the final stages of the approach to landing, for instance at about 10 seconds prior to touch-down. If an engine runs up uncontrollably to a high thrust in this scenario, causing the aircraft to yaw, the pilot will standardly take corrective action, using the rudder to bring the aircraft back towards the intended line of approach, and then will institute a go around procedure. The faulty engine can then be safely shut down before any subsequent attempt to land is made.

However, if the known OPU is employed, the pilot may be denied this opportunity to go around; if while the corrective rudder action is being applied, the OPU shuts down the rogue engine, the aircraft will yaw violently in the opposite direction and there is a high likelihood that the aircraft at that point will no longer be in control.

The overthrust protection system described herein is able to adapt itself to these and/or other flight scenarios, to take action appropriate to the specific situation.

More specifically, for instance, the system described below can be used to determine an overthrust condition by use of the low pressure (LP) shaft speed alone or the LP shaft speed to throttle angle relationship. The system retains the option to shut down the engine by closing a shut-off valve (similarly to the known OPU), but also allows for the possibility to instead reduce the fuel flow to the combustor of the gas turbine by opening a fuel bypass valve. In the latter case, the amount of fuel flow reduction can be set in relation to the static air pressure at the altitude at which the aircraft is operating.

In common with known fuel control systems, in the system seen in FIG. 1 fuel is supplied from the fuel tanks (not shown) of an aircraft to fuel spray nozzles 2 of a combustor 4. The fuel is drawn from the tanks by a low pressure pump 6, the output of this pump being connected to the input of a high pressure pump 8. The high pressure pump 8 then supplies the fuel nozzles 2 through a fuel metering valve 10.

Fuel is supplied to the engine by the metering valve 10 and the high pressure pump 8, one or both of which are controlled by an electronic controller 12 (customarily referred to as the electronic engine controller or EEC) to control the flow of fuel to match a fuel demand calculated based on the desired thrust (i.e. the position of the throttle lever) and other operating parameters including engine pressures, engine temperatures, shaft speeds and 'airframe signals' including parameters such as, for example, 'low' or 'high' idle selection, 'airdata', and others. The EEC 12 stores a set of control laws for the engine which are used to govern the limits of the fuel demand to ensure that the engine does not operate beyond its prescribed limits. The EEC 12 can operate in a conventional manner and as such requires no further description here.

A further valve 14, positioned in the fuel supply line 16 between the metering valve 10 and the combustor 4, can operate to totally shut-off the fuel supply to the spray nozzles 2, causing the gas turbine to shut down. Under normal engine operating conditions this shut-off valve remains fully open. This valve 14 may also serve as a fuel pressure raising valve, i.e. a valve which controls the fuel pressure at points within the fuel system.

With the aim of ensuring the integrity of the engine and avoiding compromise of the aircraft's stability, even when the EEC fails to appropriately control the fuel supply, an overthrust protection system (designated generally by the reference numeral 20) is provided.

This system 20 includes a bypass fuel line 22 branching from the fuel supply line 16 between the metering valve 10 and shut-off valve 14 and rejoining the supply line at the inlet side of the high pressure pump 8. A bypass control valve 24 is positioned within the bypass line 22 and is operable to control, in combination with a downstream flow restrictor 26, the fraction of the fuel flow from the fuel metering valve 10 that is diverted along the bypass line 22 rather than being supplied to the fuel spray nozzles 2. This fraction may be fixed by the geometry of the valve 24 and the geometry of the fuel system or may be variable, for example in dependence on the input of static air pressure. This can ensure that the correct level of fuel flow is pulled off in response to the overthrust event.

Under normal engine operating conditions the bypass valve 24 remains fully closed so that the total fuel flow, determined by the EEC 12, is supplied to the nozzles 2 of the combustor 4.

The overthrust protection system also includes an electronic controller 28, which is independent of the EEC 12 and will be referred to as an "electronic protection controller" in the following in order to distinguish it from the EEC 12. The electronic protection controller serves to detect an overthrust position, in the manner discussed further below, and to control both the bypass control valve 24 and fuel shut-off valve 14 to react to any detected overthrust condition.

The inputs to the electronic protection controller 28 are those from which an overthrust condition can be recognised as well as flight condition. In the present example these are:

(a) engine low pressure shaft speed;

(b) engine intermediate pressure shaft speed;

(c) ©throttle position;

(d) an indication of "weight-on-wheels" or an equivalent signal which indicates whether the aircraft is on the ground or in flight; and (e) static air pressure The 'weight on wheels' input, (d), is included in order that the electronic protection controller can distinguish between overthrust conditions on the ground and in the air, since as mentioned already above the thrust thresholds above which controllability problems are likely to occur, and thus above which an overthrust condition should be flagged can be significantly lower when an aircraft is on the ground than when it is in flight. The corrective action to be taken may also differ.

Input (e), static air pressure, can be provided by the existing aircraft systems, from a pressure transducer built in with the electronic protection controller 28, or a hydromechanical pressure actuated device can be incorporated in the bypass control valve 24.

Even where the inputs of the electronic protection controller 28 overlap with those of the EEC 12, for example shaft speeds, the possibility to use the same sensors is not taken. Rather, separate, independent sensors are employed for the input to the electronic protection controller 28. This is because one reason for a loss of thrust control by the EEC 12 may be a faulty sensor.

The electronic protection controller stores a set of rules from which it can determine whether or not an overthrust condition exists in the gas turbine engine. In a simple form, these rules need only comprise one or more fixed thresholds for the shaft speeds, an overspeeding shaft being a primary indicator of an overthrust condition.

In the present case, it is proposed to set two thresholds for the speed of the low pressure shaft. If the shaft speed exceeds the first, lower threshold, the electronic protection controller recognises an overthrust condition and takes corrective action. The second, higher threshold is selected to represent an overthrust condition that requires shut down of the engine if its integrity is to be maintained and the controller will respond to a breach of this threshold by instructing the fuel shut-off valve to close.

In a more sophisticated form, the shaft speed thresholds, in particular the lower of the low pressure shaft speed thresholds, might advantageously themselves be variable dependent on the aircraft's flight condition, or a relationship with throttle angle. For instance, one set of thresholds might apply when the aircraft is on the ground and another, higher set of thresholds be employed when the aircraft is in the air, indicated by the input from the "weight-on-wheels" input to the electronic protection controller.

Whether fixed or variable, the appropriate speed thresholds can be predetermined for any particular engine based on its performance limits and the performance characteristics of the aircraft it propels.

A further set of rules, also stored by the electronic protection controller, are used to determine what corrective action should be taken once an overthrust condition is detected. Again, for any particular case these rules can be optimised based on empirical, calculated or simulated data giving an understanding of which reactive measures are most appropriate under which circumstances.

By way of example, it is currently thought that when the aircraft is on the ground, the most appropriate corrective action in response to an overthrust condition is to shut down the rogue engine. Thus, the rules embedded in the electronic protection controller can be set such that when the controller determines there to be an overthrust condition and the "weight-on-wheels" signal indicates that the aircraft is on the ground, the controller instructs the fuel shut-off valve 14 to close.

On the other hand, during flight, it may be inappropriate to shut down the engine automatically. Rather, the decision as to when and how to shut down the engine might be best left to the pilot, so all the electronic protection controller need do is flag up to the pilot that an overthrust condition exists.

However, particularly if an engine is at a dangerous overspeed condition, although it may be preferable to keep the engine running, the appropriate action might be to reduce the thrust of the rogue engine. In these circumstances the electronic protection controller instructs the fuel bypass valve 24 to open, reducing the flow rate of fuel to the combustor 4. Rules embedded in the electronic protection controller may also indicate the degree of opening of the valve 24, and hence the fraction of the fuel flow diverted to the bypass line 22, that is appropriate to the particular level of overthrust, the throttle position and flight condition.

FIG. 2 illustrates a preferred implementation of the above logic. First, a standard overspeed check is conducted 50 using the existing OPU. The system then determines whether the aircraft is on the ground or in the air 52, based on the input from the 'weight on wheels' indicator.

If the aircraft is on the ground, the system determines whether an overspeed event exists 54 by comparing the LP shaft speed against a previously defined on ground overthrust limit for this speed, this limit being defined as a function of throttle lever angle. If the limit is exceeded 56, the system checks to see whether a shut down option is selected 58, and if it is 60 the system closes the shut-valve 14 to shut down the engine 62. If, on the other hand, the shut down option is not selected 64, the system addresses the overthrust event by opening the bypass valve 24—the appropriate degree of opening of the valve is first calculated based on a predefined on-ground static air pressure to valve opening relationship 66 and the system then operates the valve to move to the calculated position 68.

If at step 54 it is determined that no overthrust event exists 70, the bypass valve 24 remains closed and the shut-off valve 14 open 72.

If at step 52 it is determined that the aircraft is in flight, the presence or otherwise of an overthrust condition is again determined based on the speed of the LP shaft, but in this case by comparing the speed with a predetermined in-air limit 74. The in-air limit can be different from the on-ground limit, but is also expressed as a function of throttle angle.

If the in-air limit is exceeded 76, a position of the bypass valve 24 is calculated based on a predefined in-air static air pressure-valve opening relationship 78 and valve opened to that position 80.

If the limit is not exceeded 82, then as in the on-ground case the valves 14,24 remain in their inoperative positions 72.

The above described control system/logic for the overthrust protection can be implemented in software in a conventional manner.

Furthermore, FIGS. 1 and 2 represent the functional arrangement of the system, but the physical implementation of the system may take many forms. For example, the electronic protection function 28 may be housed in the same physical unit as the electronic engine control function 12, provided that they are functionally independent of each other. Alternatively they may be housed in physically separate units. Similar considerations apply to the hydromechanical components (metering valve 10, fuel shut-off valve 14, bypass valve 24 and downstream flow restrictor 26) of the system.

We claim:

1. An overthrust protection system for a gas turbine in which fuel is supplied at a controlled flow rate to a combustor of the gas turbine, the overthrust protection system comprising:
   - a bypass valve for diverting fuel flow away from the combustor;
   - detection means for detecting an overthrust condition of the gas turbine; and
   - overthrust control means for controlling the bypass valve to divert fuel flow in response to a detected overthrust condition, said overthrust control means controlling the operation of a fuel shut-off valve.

2. A system according to claim 1, wherein the bypass valve is controllable to divert a variable fraction of the fuel flow.

3. A system according to claim 2, wherein the fraction of fuel diverted is calculated based on an operating state of the gas turbine and/or a system of which the gas turbine forms a part.

4. A system according to claim 1, wherein said overthrust detection means comprise a speed sensor for sensing the speed of a shaft of the gas turbine, and means for comparing a sensed shaft speed with a predetermined speed threshold.

5. A system according to claim 4, wherein said predetermined speed threshold is a function of the operating state of the gas turbine and/or a system of which the gas turbine forms a part.

6. A system according to claim 1, wherein the gas turbine includes a normal fuel supply system, said overthrust protection system and said normal fuel supply system include sensors forming respectively part of the normal fuel supply system and said overthrust protection system, said overthrust detection means provides inputs to the overthrust control means which are independent of sensors for the normal fuel supply system.

* * * * *